United States Patent [19]
Langos et al.

[11] Patent Number: 5,562,934
[45] Date of Patent: Oct. 8, 1996

[54] BLOW MOLDING MACHINE

[75] Inventors: Peter Langos, Sankt Augustin; Uwe Humrich, Weilerswist, both of Germany

[73] Assignee: Mauser-Werke GmbH, Brühl, Germany

[21] Appl. No.: 307,684

[22] PCT Filed: May 12, 1993

[86] PCT No.: PCT/EP93/01186

§ 371 Date: Sep. 22, 1994

§ 102(e) Date: Sep. 22, 1994

[87] PCT Pub. No.: WO93/23232

PCT Pub. Date: Nov. 25, 1993

[30] Foreign Application Priority Data

May 15, 1992 [DE] Germany .............................. 9206649 U

[51] Int. Cl.$^6$ .................................................. B29C 49/56
[52] U.S. Cl. ........................ 425/451.3; 425/532; 425/541
[58] Field of Search ........................................ 425/522, 532, 425/541, 451.3, 538; 264/540

[56] References Cited

U.S. PATENT DOCUMENTS

| 3,576,048 | 4/1971 | Stanley ........................................ 425/541 |
| 3,636,151 | 1/1972 | Nagai ................................... 425/532 X |
| 3,860,375 | 1/1975 | Kinslow, Jr. et al. ............... 425/541 X |

*Primary Examiner*—Richard L. Chiesa
*Attorney, Agent, or Firm*—Henry M. Feiereisen

[57] ABSTRACT

A blow molding machine designed as a two station machine (10) has at least one extrusion device (12) and an accumulator head which supplies a tubular thermoplastic parison to two blow molds arranged next to each other and having two horizontally movable blow molding halves. In order to simplify the construction of the machine at reduced space and to achieve a high productivity, the blow molding machine according to the invention has only a three-platen system with three mold mounting plates (22, 24, 26) for clamping the four blow molding halves (14, 16, 18, 20).

9 Claims, 6 Drawing Sheets

BLOW MOLDING MACHINE

BACKGROUND OF THE INVENTION

The invention refers to a blow molding machine designed as two-station machine including at least one extrusion device, possibly with accumulator head, which supplies a tubular thermoplastic parison to two blow molds arranged next to each other and having two horizontally movable blow mold halves, and a machine frame upon which the two blow molds or four blow mold halves are slidably supported.

Such a two-station blow molding machine is generally known per se. The known machine is provided with a complex encircling frame structure with four bars and additional external support of the drive unit as five-platen-system. This incurs significant initial costs, requires a need for large space and necessitates a complicated control of two separate closing devices.

SUMMARY OF THE INVENTION

It is an object of the present invention to provide an efficient two-station blow molding machine which enables a high productivity at low initial costs and operating expenses and at reduced demand for space. In accordance with the invention, this object is attained by providing only one three-platen system with three mold mounting plates for clamping the four blow mold halves, with one blow mold half of each of both blow molds being affixed to the central mold mounting plate. The central mold mounting plate thus carries one blow mold half on each side to the right and to the left.

A proper handling of the machine with unrestricted product removal capability and no obstructing cross bars is advantageously attained by designing the machine frame only in form of a table which is exclusively arranged underneath the blow mold halves and mold mounting plates. The horizontal movement and rapid feed-closing movement of both blow mold halves is thereby provided in an amazingly simple manner by only one single driving cylinder, the piston rod of which is mounted at both sides to the machine frame while the final locking motion of the respective blow mold halves to their final locking position is effected by providing each mold mounting plate with separate locking units comprised of small locking cylinders with opposing locking pins. For smaller products like e.g. a 10l canister, it is sufficient to provide in the center of a respective blow mold at half height two neighboring closing cylinders with locking pins (as shown in the drawings). For larger blow molding products (e.g. a 220 l drum) and at larger blowing pressures and prevailing forces, all four corner areas of each mold mounting plate are provided with the respective closing cylinders and locking pins.

In accordance with an embodiment of the invention, the single driving cylinder is operatively connected with the respective blow mold halves to be actuated via a coupling, preferably in form of a hydraulic cylinder with pinion engageable and shiftable in the racks of the synchronizing devices. Thus, in a most simple way, a 2-station blow molding machine can be made available with an operationally advantageous motion system.

The three-platen system according to the invention provides the following advantages:

open, frameless structure, lack of heavy frame construction since a closed power system is respectively provided within each mold mounting plate;

targeted introduction of the closing forces into the blow mold halves, no disturbing cross beams or bars e.g. at product removal, mold replacement or repair works, small structural units with slightly moving masses, thus requiring small forces at fast feed motions, slight wear of moving parts, minimization of the number of components, compact structure, mobility of the entire arrangement, minimization of the machine size and demand on space required in the production hall, increase of the productivity at reduced investment, easy handling (control) of the machine, low operational costs and possibility of a simultaneous production of two different products, A particular feature is the complete mobility of the entire two-station blow molding machine, for example via rails in the foundation and wheels underneath the base frame of the machine. Suitably, the moving wheels for the entire machine unit are equipped with a separate drive motor. This embodiment is in particular very advantageous when replacing molds or dies because the accessibility is considerably improved.

BRIEF DESCRIPTION OF THE DRAWING

The invention is now explained and described in more detail with reference to an exemplified embodiment illustrated in the drawings, in which.

DETAILED DESCRIPTION OF PREFERRED EMBODIMENTS

Figure 1:
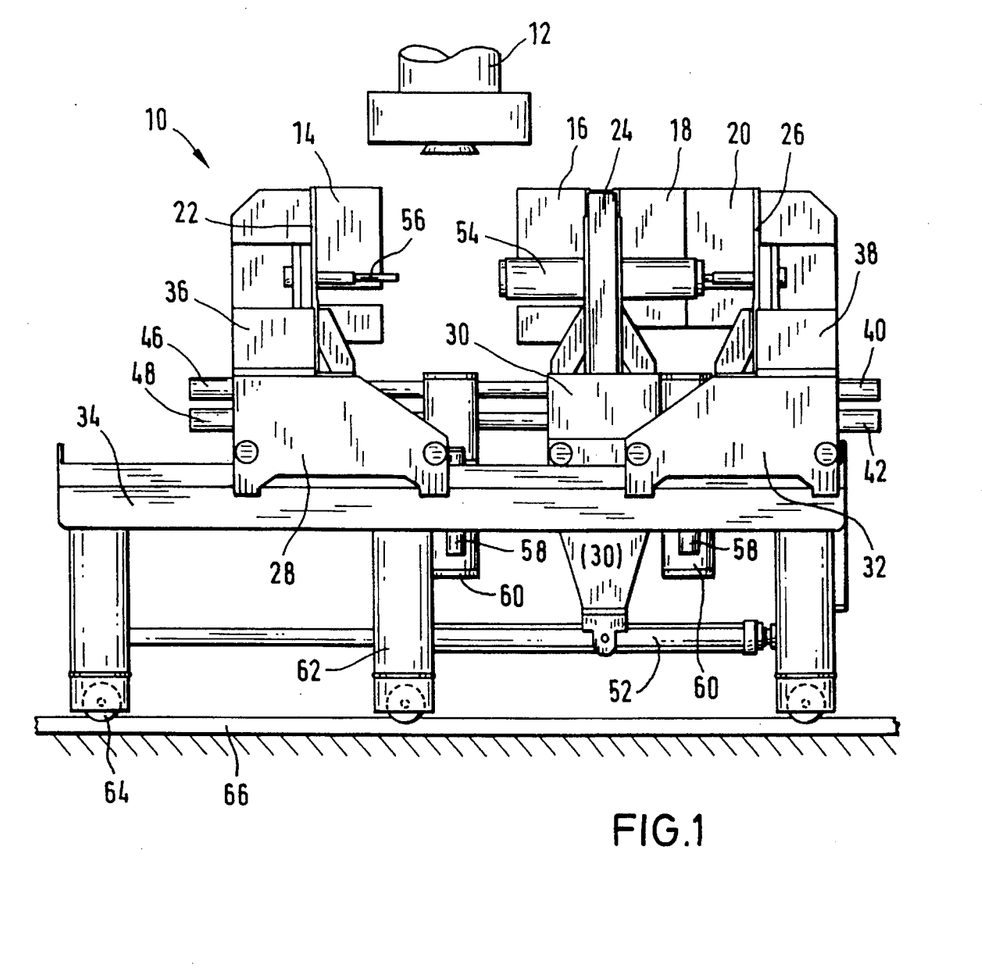
FIG. 1 shows a two-station blow molding machine according to the invention.

In FIG. 1, reference numeral 10 designates a two-station blow molding machine according to the invention with a three-platen system for mounting four blow mold halves 14, 16; 18, 20. Indicated centrally above the blow molding machine 10 is an extrusion device 12 which supplies a tubular parison of thermoplastic material, extruded from a die ring, to two neighboring horizontally slidable blow molds for blowing hollow plastic bodies such as e.g. canisters, large volume drums (lidded drums, bunged drums or the like). The tubular parison may e.g. also be extruded continuously to enable a continuous operation. In a discontinued operation, the tubular parison is ejected intermittently from the extrusion device with respective accumulator head.

Figure 4:
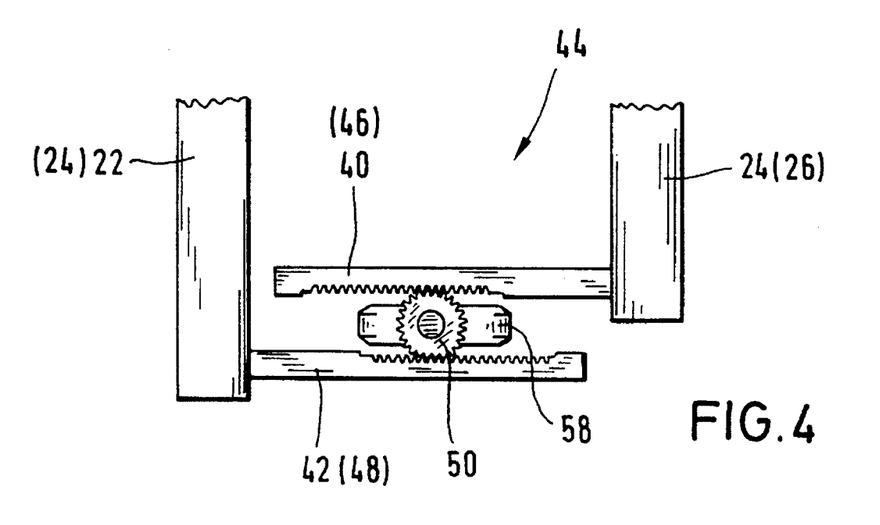
FIG. 4 shows a schematic illustration of the synchronizing device of the blow molding machine and FIG. 10 a view of the blow molding machine upon dismantling of a blow mold.

The four blow mold halves 14, 16 and 18, 20 are affixed in easily detachable manner and mounted to three mold mounting plates 22, 24 and 24, 26, with the central mold mounting plate 24 carrying on the front side and back side a respective blow mold half 16 and 18. The three mold mounting plates 22, 24, 26 are supported for horizontal displacement via platforms 28, 30, 32 on a base machine frame which is formed as flat table 34. In contrast to conventional two-station blow molding machines, the base machine frame in form of a table 34 is arranged exclusively underneath the blow molds and platforms 28, 30, 32 of the mold mounting plates 22, 24, 26 for mounting and clamping the blow mold halves 14, 16; 18, 20. The platforms 28, 30, 32 are guided for displacement by e.g. rollers on rails or guide bars arranged laterally of the table 34. Both outer mold mounting plates 22 and 26 are each further propped via an external support 36, 38 on both outer platforms 28 and 32. For guiding the platforms 28, 30, 32 and the pertaining blow mold halves in synchronism, two small hydraulic centering cylinders 58 are provided centrally underneath each blow mold. The hydraulically centering cylinders 58 are arranged e.g. laterally next to the blow mandrel device 60 which is also arranged always centrally in the mold parting plane, as indicated in FIG. 1. At normal operation, only one gear 50 is in effective engagement by means of the respective centering cylinder 58. The centering cylinders 58 of the synchronizing guide system are operatively connected to the synchronizing device 44, with the synchronizing device 44 including e.g. a rack and pinion system with a right and a left rack 40, 42 and 46, 48 and an interposed gear 50 or pinion, as schematically illustrated in FIG. 4. One rack 40, 42 and 46, 48 is thereby securely fixed to one mold mounting plate 22 and 24; 24 and 26, respectively. Both racks may certainly be arranged also above/below each other.

Through actuation of the centering cylinders, the gear 50 of the synchronizing device 44 engages for example both racks 46, 48 or is idle through displacement (disengagement). The horizontal movement and rapid closing movement (rapid feed) of both blow mold halves 14, 16 and 18, 20 is effected only by a single hydraulic driving cylinder 52 which is arranged centrally on the table 34 and is connected and coupled with the downwardly extended central platform 30. Thus, the driving cylinder 52 directly moves only the central platform 30 with the central mold mounting plate 24 and both blow mold halves 16, 18 affixed thereto. The outer blow mold half 14 or 20 of the respectively closed blow mold is thereby coupled by its own separate locking unit to the inside blow mold half 16 or 18 while the centering cylinder of the closed blow mold renders the synchronizing device idle. At open blow mold, the synchronizing device is operated through engagement of the pinion by means of the centering cylinder, and the movement of the driven inside blow mold half 16 or 18 (via mold mounting plate 24 and platform 30 and driving cylinder 52) is effected relative thereto by the opposing outside blow mold halves 14 or 20 also in opposite direction. The final locking motion of the respective blow mold halves 14, 16 and 18, 20 into their locking position is effected by separate locking units comprised of a small closing cylinder 54 with opposing locking pin 56 and respectively arranged on the mold mounting plates 22, 24, 26. A blow mandrel device 60 with respective expanding mandrel and blow mandrel is arranged on the table 34 centrally underneath each blow mold. Expanding mandrel and blow mandrel are movable relative to each other in a known manner, that is moved together for attachment of the parison and moved apart during closing of the blow mold halves. It is in particular noteworthy regarding the drive of the blow mold halves by means of the driving cylinder 52, that the piston rod is fixedly secured in the frame on both sides and the driving cylinder 52 as moving pad travels hydraulically along the fixed piston rod.

The table 34 stands on two or here three legs 62. In accordance with a preferred embodiment, the legs 62 are equipped on their lower extremity with rollers or wheels 64 and the entire blow molding machine 10 travels or is movable on rails 66 or other means. In order to effect the displacement of the entire arrangement, the wheels 64 may be provided with a particular linear drive (e.g. electromotor).

Figure 2:
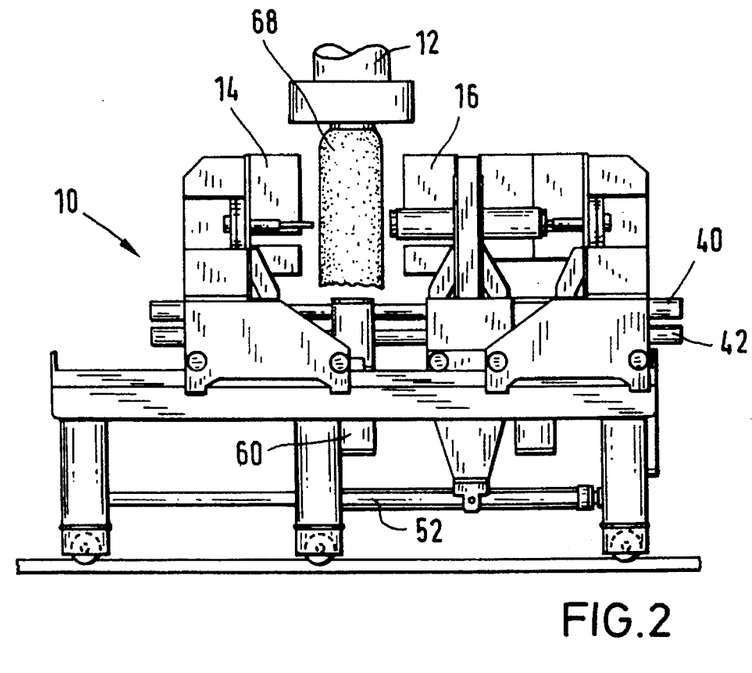
FIG. 2, 3 and 5–9 show various positions of a two-station blow molding machine.
Figure 3:
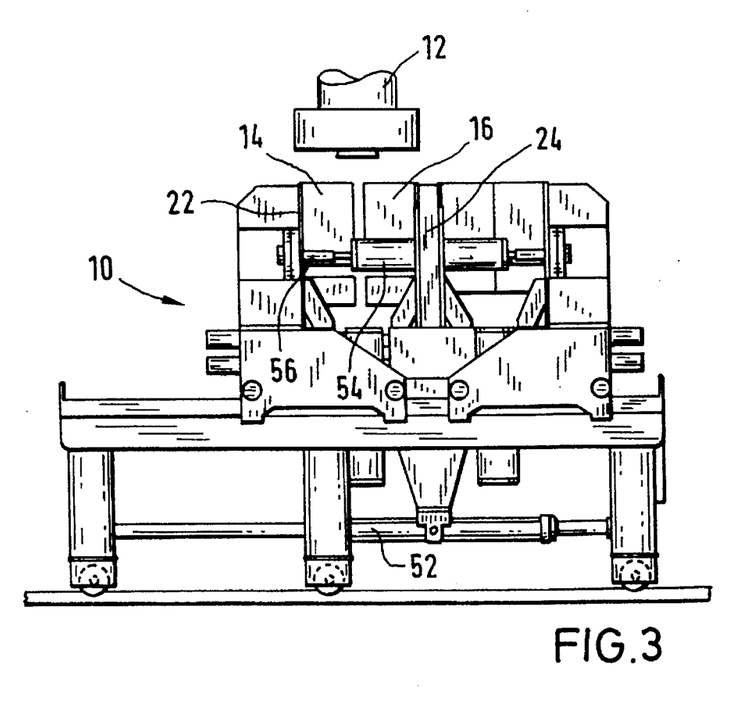
Figure 5:
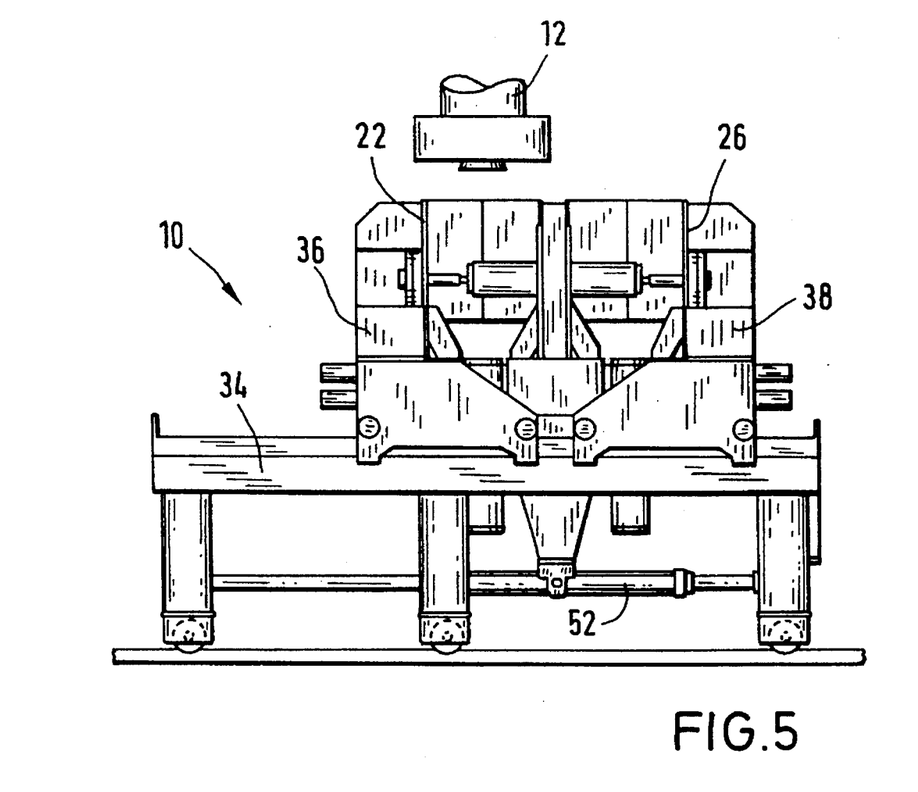
Figure 6:
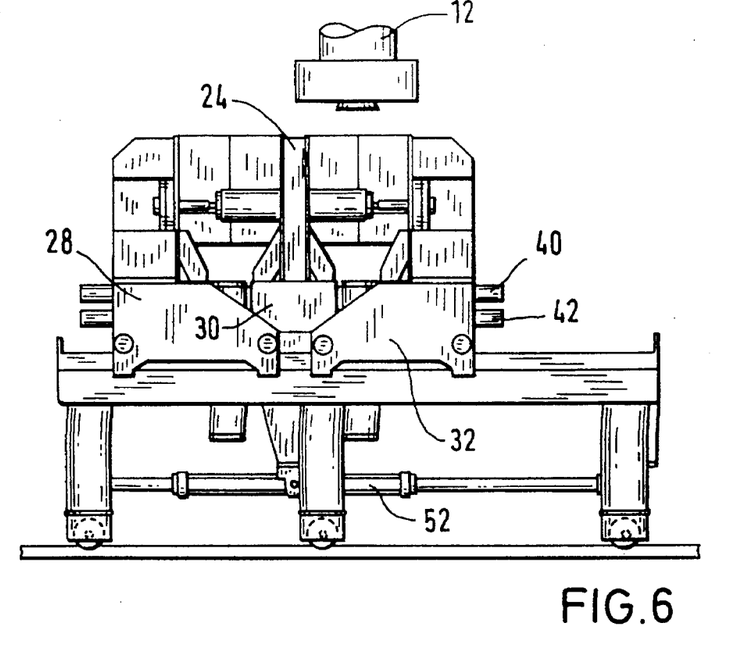
Figure 7:
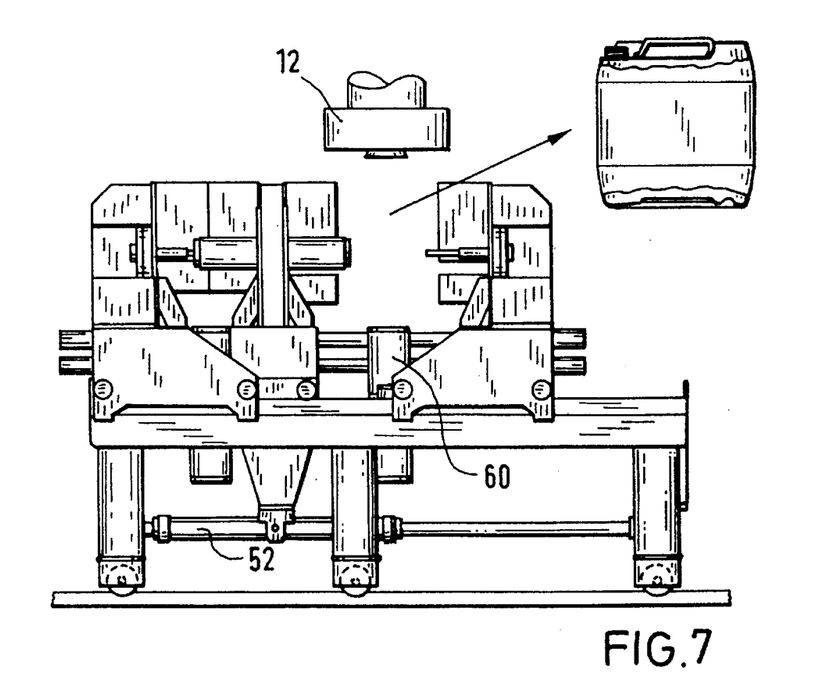

The mode of operation of the two-station blow molding machine is evident from the following drawings: In accordance with the new control concept, at operation of the machine one station is always closed while the other station is shifted or moved. In FIG. 2, the right station is closed while both blow mold halves 14, 16 of the left station are completely open. After ejecting the tubular parison 68 from the extrusion device 12 and the spreading of the tube by means of the expanding mandrel and blow mandrel of the blow mandrel device 60, the rapid closing of the left station is effected until reaching the position "inching". This is effected by means of the centrally arranged hydraulic driving cylinder 52 underneath the blow mandrel device 60. Two small hydraulic centering cylinders 58 arranged centrally and in the blow mold parting line next to the blowing mandrel device 60 maintain the synchronizing guide systems in position. The synchronized guide systems operate e.g. according to the conventional rack and pinion system. As soon as the position "inching"—illustrated in FIG. 3—is reached, the closing cylinders 54 and locking pins 56 arranged on the mold mounting plates 22 and 24 assume the retarded locking motion while pinching off the tube under great force application and hold the blow mold closed against the prevailing blowing pressure. As shown in FIG. 5, both stations are now closed. After releasing both centering cylinders 58, both stations, which are supported by the platforms 28, 30, 32 for rolling upon the table 34, are positioned by the driving cylinder 52 in such a manner that the right station now stops again underneath the accumulator head 12, as shown in FIG. 6. The centering cylinders secure thereby the synchronizing guide system. After elapse of the blowing time and release of the locking units, the right station is opened by means of the driving cylinder for allowing a removal of the finished blow molded hollow body, as shown in FIG. 7. As soon as the blown hollow body, here a canister, is removed from the blow mold, a new tubular thermoplastic parison is again ejected from the die ring of the extrusion device 12, and the further operation proceeds in a same manner as previously described in connection with the left station.

Figure 8:
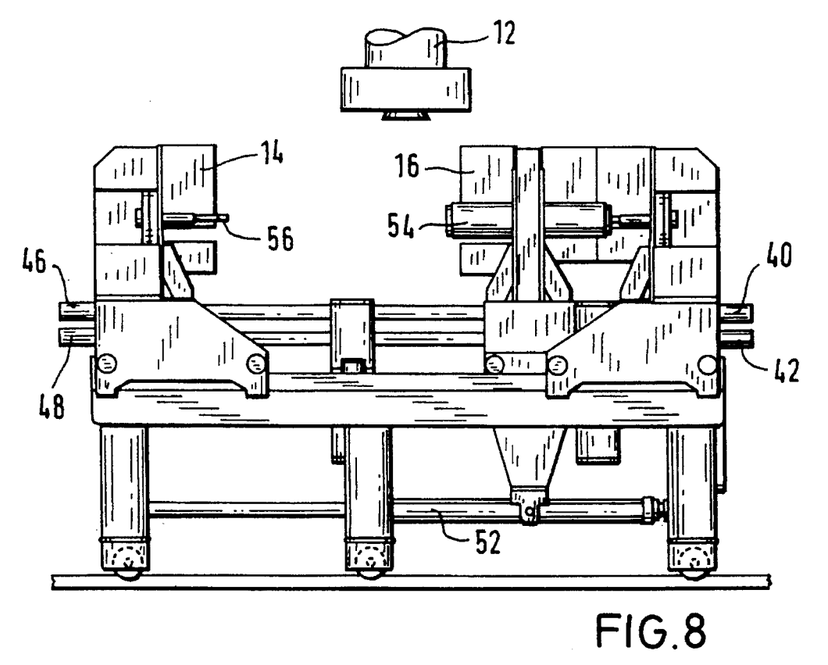
Figure 9:
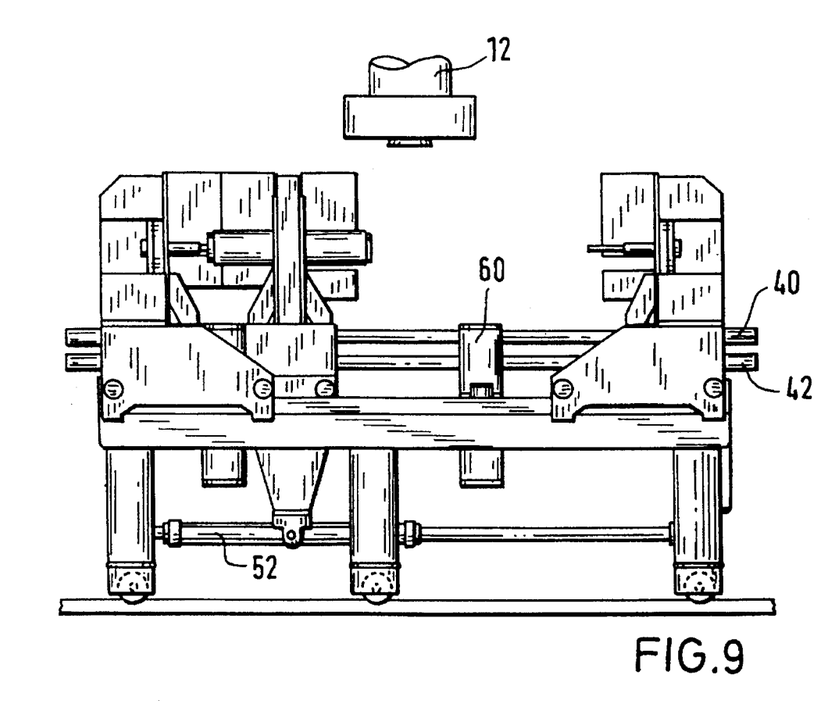
Figure 10:
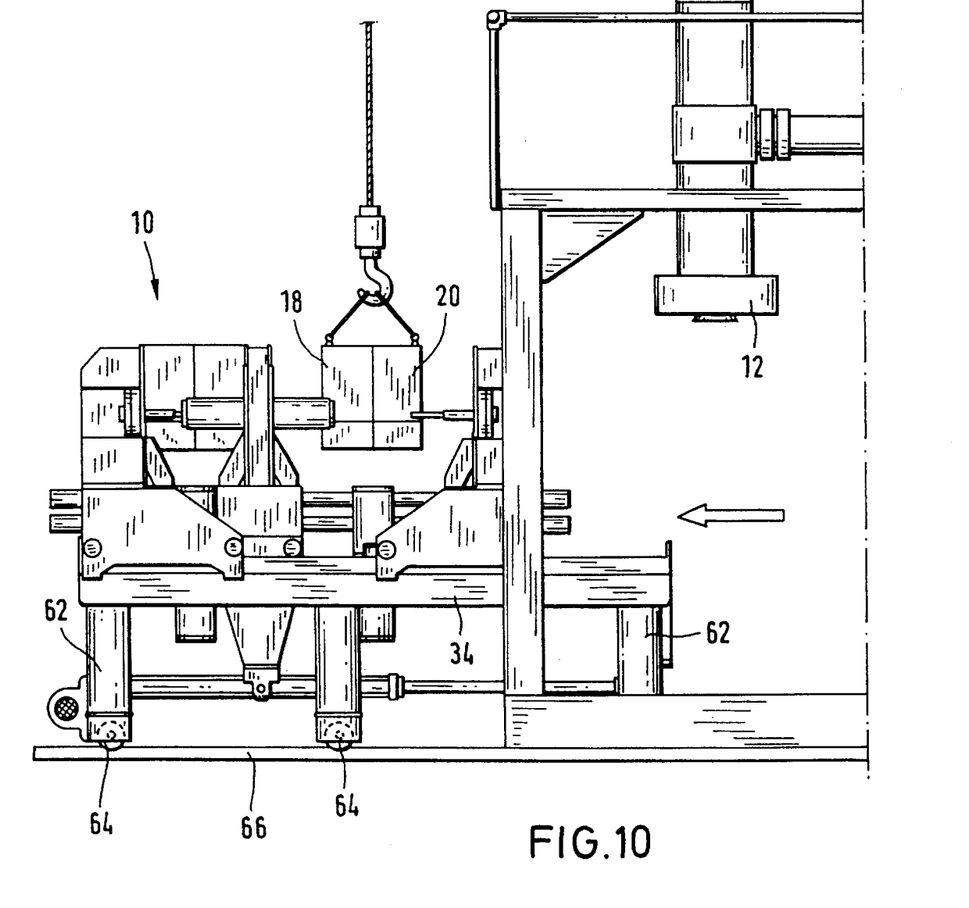

In order to improve the accessibility e.g. for maintenance purposes, the normal operational opening distance until the "opening position" of both mold halves can be significantly increased. In this case, both centering cylinders 58 are idle. Through selective actuation of the driving cylinder 52, the left station—as illustrated in FIG. 8—or the right station—as illustrated in FIG. 9—can be opened even further to a "maintenance position". A precondition for that is a corresponding length of the rails for the platforms. As best seen from FIG. 10, the entire two-station blow molding machine unit is movable together with the lower base frame 34. This is effected e.g. via rails 66 in the foundation and wheels 64 underneath the legs 62 of the base frame 34. This is especially advantageous when replacing one blow mold or e.g. during a change of dies in the extrusion device 12. In FIG. 10, the two blow mold halves 18, 20 of the right station are about to be dismantled by means of a crane hook, with the blow mold machine unit being moved out from underneath the extrusion device 12. The mobility of the blow mold machine unit could e.g. also be utilized to alternately position the blow molds underneath two neighboring extrusion dies and accumulator heads. In principle, the two-station blow molding machine could be used to simultaneously produce two different types of hollow bodies, e.g. a 60 l barrel with lateral drop handles in the left station and a 60 l standard lidded drum in the right station. However, also random container shapes even with different container size (e.g. 150 l conical lidded drum and a 160 l bunged drum) can be produced simultaneously with the new blow molding machine. When equipping the plant with a second extruder or accumulator head, also containers of different colors or different plastic material could be blown.

Above description and drawings clearly illustrate the advantageous embodiment of the two-station blow molding machine according to the invention with new three-platen system.

LIST OF REFERENCE NUMERALS 10 two-station machine
12 extrusion device
14 blow mold half-left station
16 blow mold half-left station
18 blow mold half-right station
20 blow mold half- right station
22 left mold mounting plate
24 central mold mounting plate
26 right mold mounting plate
30 central platform
32 right platform
34 table (base frame)
36 left mold mounting plate support
38 right mold mounting support
40 upper rack (right station)
42 lower rack (right station)
44 synchronizing device
46 upper rack (left station)
48 lower rack (left station)
50 gear (pinion)
52 moving cylinder
54 closing cylinder
56 locking pin
58 centering cylinder for (44)
60 blow mandrel device
62 frame legs
64 roller (wheels)
66 rails
68 plastic parison

We claim:

1. A blow molding machine in form of a two-station machine, comprising:

an open machine frame;

a pair of blow molds arranged next to each other and each being split to define two blow mold halves;

clamping means mounted on said machine frame for supporting said blow mold halves during movement in a horizontal direction, said clamping means being a three-platen system with three mold mounting plates, with a central mold mounting plate thereof supporting one blow mold half of each blow mold;

support means movably mounted on said machine frame for individually securing each of said mold mounting plates to said machine frame and allowing movement of said mold mounting plates separately from each other in horizontal direction; and at least one extrusion means supplying a tubular thermoplastic parison to said blow molds.

2. The blow molding machine of claim 1 wherein said machine frame is formed as a table which is exclusively arranged underneath the blow mold halves and mold mounting plates, and further comprising rails laterally secured on said table for guiding said support means during movement thereof.

3. The blow molding machine of claim 1, and further comprising a drive means formed with one single driving cylinder operatively connected to the central mold mounting plate for effecting a horizontal movement of said blow mold halves.

4. The blow molding machine of claim 3, and further comprising a coupling unit for operatively connecting said driving cylinder with said blow mold halves.

5. The blow molding machine of claim 4 wherein said coupling unit includes a hydraulically actuated centering cylinder formed with a pinion for cooperation with a rack assembly secured to said mounting plates, with said pinion being engageable in said rack assembly through actuation of said centering cylinder.

6. The blow molding machine of claim 1 wherein each said blow molds is provided with a separate locking mechanism formed with a small locking cylinder secured to one mounting plate and an opposing locking pin secured to the central mounting plate for effecting a final locking motion of said blow mold halves into the final locking position.

7. The blow molding machine of claim 6 wherein under normal operational conditions one of said blow molds is closed and locked by the respective locking mechanism while the other one of said blow molds is open, with its blow mold halves executing a closing or opening motion, whereby said one blow mold on one side of said central mold mounting plate follows the movement of said blow mold half on the other side of said central mold mounting plate through coupling via said common central mold mounting plate.

8. The blow molding machine of claim 1 wherein said blow mold halves are movable beyond a normal operational opening position to an even further opened maintenance position.

9. The blow molding machine of claim 1, further comprising a separate drive for moving the entire two station machine together with said machine frame.

* * * * *

UNITED STATES PATENT AND TRADEMARK OFFICE
CERTIFICATE OF CORRECTION

PATENT NO. : 5,562,934
DATED : October 8, 1996
INVENTOR(S) : Peter Langos

It is certified that error appears in the above-indentified patent and that said Letters Patent is hereby corrected as shown below:

Column 5, line 46,
    Claim 1, line 46, change "in form of" to --being--;
Col. 6, Claim 2, line 13, delete "laterally";
    Claim 6, line 31, change "molds" to --mold--.

Signed and Sealed this

Seventh Day of January, 1997

Attest:

BRUCE LEHMAN

*Attesting Officer*      *Commissioner of Patents and Trademarks*